United States Patent [19]

Clyde

[11] 4,083,902

[45] Apr. 11, 1978

[54] METHOD OF SEALING A CONNECTOR

[75] Inventor: A. Lofdahl Clyde, Los Altos, Calif.

[73] Assignee: Raychem Corporation, Menlo Park, Calif.

[21] Appl. No.: 758,156

[22] Filed: Jan. 10, 1977

[51] Int. Cl.² .......................... B29D 3/00; B29D 27/00

[52] U.S. Cl. ....................................... 264/26; 264/46.5; 264/46.6; 264/46.7; 264/261; 264/267; 264/272; 264/279

[58] Field of Search .................. 264/24, 45.1, 26, 45.6, 264/46.4, 46.5, 46.6, 46.7, 248, 261, 262, 263, 266, 267, 272, 279; 29/628, 629; 156/79, 273, 321, 293, 306; 339/275 R, 275 T

[56] References Cited

U.S. PATENT DOCUMENTS

| | | | |
|---|---|---|---|
| 2,949,642 | 8/1960 | Lieberman | 264/272 |
| 3,236,936 | 2/1966 | Robinson | 264/272 |
| 3,328,512 | 6/1967 | Lemke et al. | 264/272 |
| 3,406,374 | 10/1968 | Martin | 264/272 |
| 3,429,981 | 2/1969 | Shallahamer et al. | 264/272 |

*Primary Examiner*—Willard E. Hoag
*Attorney, Agent, or Firm*—Lyon & Lyon

[57] ABSTRACT

A process for environmentally sealing and strain relieving at least one electrical lead wire connected to an interior terminal of a connector of the type which possesses a tubular orifice through which the lead wire extends comprising the steps of disposing a laminated disc comprising a lower layer of foaming adhesive, an upper layer of fusible adhesive, and an aperture corresponding to each electrical lead wire within the tubular orifice with the lead wires extending through the corresponding apertures; and heating the disc whereby the foaming adhesive is caused to foam and the fusible adhesive is caused to melt and flow.

3 Claims, 7 Drawing Figures

METHOD OF SEALING A CONNECTOR

BACKGROUND OF THE INVENTION

An enormous number of modern electrical devices and mechanical devices having electrical controls utilize electrical connectors of a type wherein one or more insulated electrical lead wires feed into and/or out of the connector and connect to a terminal inside the connector. Such connectors frequently are of the break-apart type. That is, the connector may be separated essentially at will into two mating halves each with one or more lead wires emanating therefrom. Alternatively, some connectors are designed to disconnectably mate with a fixed socket in a manner fundamentally analogous to that in which an ordinary household plug (i.e., connector) mates with a wall socket. For many applications an essential requirement is that the lead wires be environmentally sealed to the connector. More specifically, the interior terminal and that portion of the conductor which is bared to enable it to make electrical contact with the terminal inside the connector body must be environmentally sealed, the connector body being water impervious and the remainder of the conductor ordinarily being protected by the wire insulation. Most connectors of the type in question comprise an elongate, more or less tubular, hollow rigid housing, usually of plastic or metal with the lead wires feeding into the interior of the housing through a hollow orifice formed in one end of the connector and the other end of the connector housing being adapted for mechanically and electrically mating with another similarly formed interlocking connector housing or with a fixed socket. Frequently the connector has a separate or integrally formed interior wall or bulkhead fixed within the housing between the interior terminals and the orifice. such a bulkhead will ordinarily have holes through which the lead wires pass. As already indicated, the connector housing or shell provides environmental protection for the interior terminal thereof but some form of sealing must be provided at the orifice end of the housing where the lead wire or wires enter. This sealing is commonly accomplished through the use of elastomeric interference fit grommets or so-called potting compounds. A commonly used potting compound comprises an epoxy resin which is poured into the connector housing orifice after insertion of the lead wires. This potting compound then cures, i.e., solidifies, and encapsulates the junction and thereby environmentally seals the orifice from the end into which the wires are inserted. Although reasonably effective in terms of sealing, these sealing techniques suffer from significant shortcomings. Specifically, the elastomeric interference fit grommets are expensive and provide no strain relief and the use of a potting procedure is labor intensive and requires a substantial set (curing) time. Therefore, it would be highly desireable if a method were available which permitted rapid and inexpensive environmental sealing of the connector orifice with the lead wires in place.

SUMMARY OF THE INVENTION

I have now discovered a new and novel process for environmentally sealing and strain relieving at least one electrical lead wire connected to an interior terminal of a connector of the type which possesses a tubular orifice through which said lead wire extends. The process comprises the steps of:

(a) disposing a laminated disc comprising a lower layer of foaming adhesive, an upper layer of fusible adhesive, and an aperture corresponding to each said at least one electrical lead wire within said tubular orifice, with said lead wires extending through said corresponding apertures; and (b) heating said disc whereby said foaming adhesive is caused to foam and said fusible adhesive is caused to melt and flow.

BRIEF DESCRIPTION OF THE DRAWINGS

The many objects and advantages of the present invention will become apparent to those skilled in the art when the following description of the best mode contemplated for practicing the invention is read in conjunction with the accompanying drawings, wherein like reference characters refer to same or similar elements, and in which.

DETAILED DESCRIPTION OF THE PREFERRED EMBODIMENT

Figure 1:
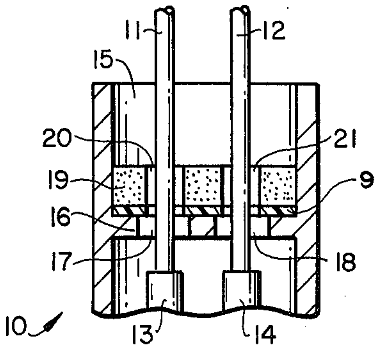
FIGS. 1 through 4 are partial cross-sectional views of adhesive seals not in accordance with the present invention.

Referring now to generally to the several figures and specifically to FIG. 1, FIG. 1 shows a side view of a typical prior art connector 10 with two lead wires 11 and 12 emanating from interior terminals 13 and 14 thereof. The connector includes a tubular orifice portion 15 and a wall or bulkhead section 16 having holes 17 and 18 through which the lead wires pass. A fusible adhesive 19 in the form of a disc is placed in the orifice 15 on a plastic support wafer 9 which rests on a bulkhead wall 16 with the lead wires being threaded through aligned holes 20 and 21 in the adhesive disc and the plastic support wafer.

Figure 2:
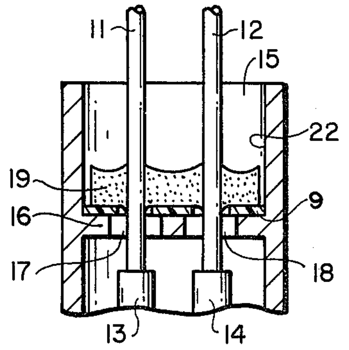

FIG. 2 shows the effect of heating the disc shown in FIG. 1 above its fusion point. As is apparent, the adhesive has fused to the lead wires but on solidifying has manifested a tendency to shrink away from the interior wall surface 22 of the orifice thus failing to provide a total environmental seal.

Figure 3:
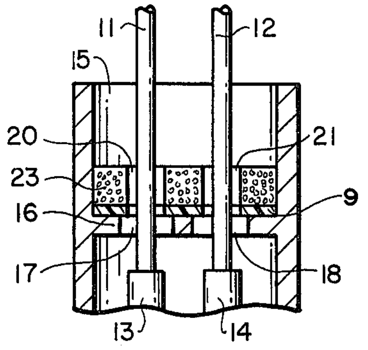
Figure 4:
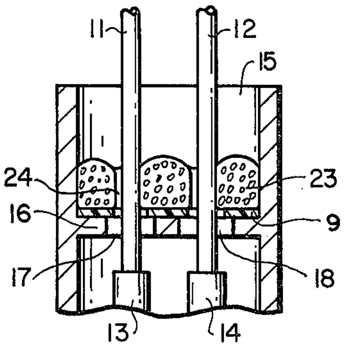

FIGS. 3 and 4 illustrate the same type of connector when a foaming adhesive 23 alone is used in an attempt to effect sealing. As is apparent, complete sealing to the lead wires is not effected, as shown at 24.

Figure 5:
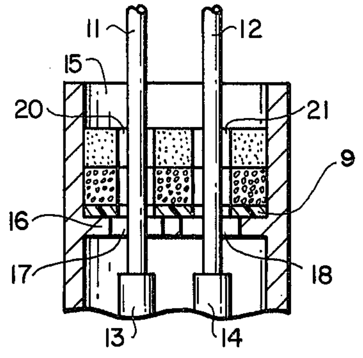
FIGS. 5 through 7 are partial cross-sectional views which illustrate the process of the present invention including (FIG. 7) a preferred embodiment thereof.
Figure 6:
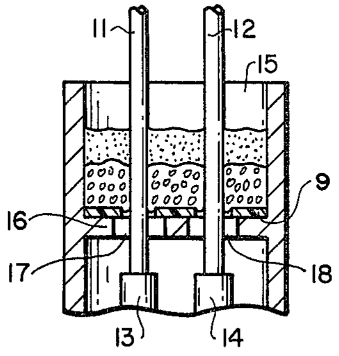

I have found that it is only when a dual layer disc having a first (lower) layer of foamable adhesive and a second upper layer of fusible adhesive that complete environmental sealing of the lead wire to the interior wall surface of the tubular orifice portion 15 is achieved. As shown in FIGS. 5 and 6, which represent side views before and after heating to a temperature above the foaming and melting temperature of the respective layers, the use of a disc combining both types of adhesives effects a complete environmental seal.

A preferred procedure entails causing the foaming layer to foam first and the fusible adhesive layer to melt thereafter. The advantage accruing from this sequence is that the foam layer serves as an effective plug or block and prevents the fusible adhesive while in the molten state from running down into the connector body as opposed remaining on the surface of the foamed adhesive layer and forming a complete environmental seal and wire strain relief on solidifying. One way to achieve this is, of course, to have the foaming temperature of the foaming adhesive be lower than the melting point of the fusible adhesive. Thus the application of heat as by a hot air blower to the disc should tend to cause foaming to occur first.

Figure 7:
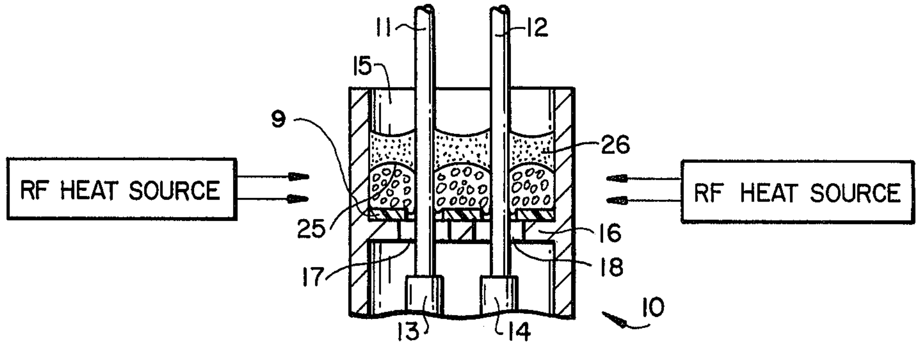

A particularly preferred embodiment of the present process involves the use of radio-frequency dielectric heating to cause the foaming adhesive to react i.e. foam prior to melting of the fusible adhesive. This will cause the foamable adhesive to foam forming a convex upper surface 25 (as shown in FIG. 7). The heat from the foam melts fuses the fusible meltable adhesive layer 26 from the bottom up causing it to adhere effectively to the outer surface of the lead wires and the inner wall surface of the orifice. Under these circumstances the melting point of the fusible adhesive will be lower than the foaming temperature but foaming will nevertheless occur first. Alternatively microwave or other electromagnetic heating of the foaming adhesive layer can be utilized. Dielectric heating which is known per se involves applying an AC voltage in the low MHz range across a dielectric (the foaming adhesive). This is basically similar to microwave or inductive heating but because of the frequency employed does not require shielding (as in microwave heating) or the presence of magnetic particles in the substrate being heated (as in induction heating). By proper selection of the frequency applied only the foaming adhesive will be heated and this heat will thereafter be transferred by simple conduction from the foamed layer to the fusible layer causing the latter to melt.

The term "foaming adhesive" connotes adhesives which on the application of heat undergo an expansion due to the formation of gas by partial chemical decomposition. Suitable adhesives include for example, a polymeric adhering material containing usually 0.5to 10%, preferably 2 to 5% by weight of a blowing agent, that is a chemical additive which upon heating decomposes to release gas which is then trapped in a polymer, thereby producing a foam or sponge. Conventional blowing agents include azodicarbonamides, dinitrosopentamethylene tetramines, p,p-oxybis-(benzenesulfonyl hadrazide) or similar organic materials familiar to those skilled in the art. Preferably the adhesive material has sufficient viscosity or strength when heated (i.e. $>$ 50,000 cps at 150° C) to promote the blowing of the special chemical agent so as to permit the formation of a cellular structure.

The term "fusible adhesive" connotes adhesives which upon being heated above a certain temperature, usually referred to as the softening range, become sufficiently fluid to flow and wet the surface of most material it comes into contact with. On cooling below this temperature, the adhesive solidifies. Particularly suitable adhesives of this type include an adhering material typically having a low molten viscosity (i.e., $\leqq$ 50,000 cps at 150° C). Such adhesives are commonly made from blends of (1) olefin polymers such as ethylene copolymers with vinyl acetate, ethyl acrylate, and the like and (2) tackifying resins such as low molecular weight polymers based on abietic acid and its derivates, aliphatic and/or aromatic petroleum feed streams (e.g., $C_5$ streams, styrene, cyccopentadiene, etc.) and/or (3) low molecular weight diluents such as waxes, low molecular weight polyethylenes or amorphous polypropylenes. Such compositions are quite familiar to those skilled in the art.

Examples of connectors for which the process of the present invention is particularly suitably include for example, automotive connectors, appliance connectors and other die cast metals, molded plastic or similar connectors having from one up to twenty or even more separate lead wires emanating therefrom.

From the foregoing detailed description, it will be evident that there are a number of changes, adaptations and modifications of the present invention which came within the province of those skilled in the art; however, it is intended that all such variations not departing from the spirit of the invention be considered as within the scope thereof as limited solely by the appended claims.

I claim:

1. A process for environmentally sealing at least one electrical lead wire connected to an interior terminal of a connector of the type which possesses a tubular member through which said lead wire extends comprising the steps of:
   (a) disposing a laminated disc comprising a lower layer of foamable adhesive, an upper layer of fusible adhesive, and an aperture corresponding to each said at least one electrical lead wire within said tubular member, with said lead wire extending through said corresponding aperture; and
   (b) heating said disc whereby said foaming adhesive is caused to foam and said fusible adhesive is caused to melt and flow, and to seal between said lead wire and an interior surface of said member.

2. A process in accordance with claim 1 wherein the foaming temperature of said foamable adhesive is below the melting point of said fusible adhesive.

3. A process in accordance with claim 1 wherein said foamable adhesive layer is capable of being heated by a high frequency field and foaming of the foamable adhesive layer is effected by dielectric heating.

* * * * *

UNITED STATES PATENT OFFICE
CERTIFICATE OF CORRECTION

Patent No. 4,083,902 Dated April 11, 1978

Inventor(s) Clyde Alphon Lofdahl

It is certified that error appears in the above-identified patent and that said Letters Patent are hereby corrected as shown below:

The inventor's name should read -- Clyde Alphon Lofdahl --.

Signed and Sealed this

***Seventeenth* Day of *October 1978***

[SEAL]

*Attest:*

RUTH C. MASON
*Attesting Officer*

DONALD W. BANNER
*Commissioner of Patents and Trademarks*